(12) United States Patent
Kim

(10) Patent No.: US 7,549,104 B2
(45) Date of Patent: Jun. 16, 2009

(54) DIGITAL SIGNAL PROCESSING METHOD AND APPARATUS PERFORMING VARIABLE NUMBER OF ERROR CORRECTION REPETITIONS

(75) Inventor: Jae-won Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 442 days.

(21) Appl. No.: 11/244,760

(22) Filed: Oct. 6, 2005

(65) Prior Publication Data
US 2006/0077822 A1    Apr. 13, 2006

(30) Foreign Application Priority Data
Oct. 11, 2004    (KR) .................. 10-2004-0081113

(51) Int. Cl.
H03M 13/00    (2006.01)

(52) U.S. Cl. .................................... 714/755

(58) Field of Classification Search .............. 714/755, 714/758
See application file for complete search history.

(56) References Cited

U.S. PATENT DOCUMENTS

| | | | | |
|---|---|---|---|---|
| 3,588,819 | A * | 6/1971 | Tong ........................... | 714/787 |
| 6,721,917 | B2 | 4/2004 | Shieh .......................... | 714/755 |
| 2001/0056562 | A1 * | 12/2001 | Shieh .......................... | 714/755 |
| 2004/0098661 | A1 | 5/2004 | Chuang et al. | |
| 2005/0050431 | A1 * | 3/2005 | Guo et al. ................... | 714/758 |
| 2005/0081132 | A1 * | 4/2005 | Chen .......................... | 714/758 |

OTHER PUBLICATIONS

Taiwanese Office Action Reference No. 09720520150, dated Sep. 30, 2008, for corresponding Taiwan Application No. 094134156.

* cited by examiner

Primary Examiner—Guy J Lamarre
Assistant Examiner—Sam Rizk
(74) Attorney, Agent, or Firm—Mills & Onello, LLP

(57) ABSTRACT

In an apparatus and a method for processing digital signals in an optical disc system, the digital signal processing apparatus includes an EDC unit that processes data that is demodulated by an EFM demodulator to determine in advance whether input data requires error correction. When EDC determination indicates that the input data has no errors, the apparatus does not carry out error correction on the data. Only when it is determined that the input data has errors, the apparatus performs error correction. Accordingly, data processing efficiency is improved. The digital signal processing apparatus repeats error correction on data having errors to a maximum of n times according to the quantity of errors. The number of error correction repetitions is made variable in order to maximize error correction capability. Furthermore, the apparatus converts erasure information generated when EFM demodulation is carried out into erasure location on a GF($2^8$) field and adds a 10-byte erasure location to the back of the parity of each PI codeword to use it for PI erasure correction. Accordingly, PI erasure correction can be efficiently performed.

23 Claims, 3 Drawing Sheets

DIGITAL SIGNAL PROCESSING METHOD AND APPARATUS PERFORMING VARIABLE NUMBER OF ERROR CORRECTION REPETITIONS

BACKGROUND OF THE INVENTION

This application claims the priority of Korean Patent Application No. 10-2004-0081113, filed on Oct. 11, 2004, in the Korean Intellectual Property Office, the disclosure of which is incorporated herein in its entirety by reference.

1. Field of the Invention

The present invention relates to an optical disc decoder system and, more particularly, to a digital signal processing method and apparatus for reading and processing data from an optical disc such as a DVD.

2. Description of the Related Art

An optical disc player reproduces data recorded on an optical disc medium such as a compact disc (CD) or a digital versatile disc (DVD). Specifically, in the optical disc player, a pick-up unit irradiates a track of the optical disc with a laser beam and detects pits on the optical disc based on variation in a reflected beam. Digital data recorded on the optical disc medium is thus reproduced.

Demodulation speed of the optical disc player is currently stabilized at approximately 16×. In addition, readability, which is the capability to read data having errors caused by a scratch or a defect on the optical disc, has become an important factor in the optical disc player. Accordingly, readability of the optical disc player is improved through repeated correction of burst, random errors, and so on. It is well known that in order to improve readability, the performance of an automatic gain controller, an equalizer, a data slicer, and a phase locked loop require enhancement. However, readability can also be improved by developing the ability to correct a larger quantity of data than is defined by DVD specifications.

In a conventional repetitive correction method, errors present in read data are corrected a fixed number of times, such as once (according to the sequence: PI (inner-code parity) correction-PO (outer-code parity) correction) or twice (according to the sequence: PI correction-PO correction-PI correction-PO correction). In this case, an error correction code (ECC) block operates to carry out error correction the predetermined fixed number of times, even when there are few or no errors. This occupies memory bandwidth and negatively impacts system throughput. Furthermore, error correction cannot be performed on input data having a multitude of random errors because the error correction sequence is carried out the fixed number of times.

Moreover, as the speed of optical disc systems continues to increase, repetitive error correction of more than two repetitions within one block cycle cannot be performed without increasing the operating frequency above 130 MHz when a cache is not used.

Meanwhile, erasure information for erasure-correcting a PI code, which is an inner code read from an optical disc, is generated by an eight-to-fourteen modulation EFM (or EFM+) demodulator of the optical disc player. Conventionally, when EFM and ECC blocks are de-coupled, a 1-bit erasure flag is added to each byte to generate 9-bit data. However, the 9-bit data is difficult to use when an SDRAM is used. Even when an internal SRAM or FIFO is used, it is difficult to generate the erasure information because the number of bits per word of the FIFO should be 9 bits in a repetitive correction mode, or because of a flag information timing problem.

SUMMARY OF THE INVENTION

The present invention provides a method and an apparatus for processing a digital signal in an optical disc system, which enable the number of repetitions of repetitive error correction performed on the digital data signal to vary according to whether there are any errors to be corrected, thereby preventing reduction of the throughput of the system, and improving system efficiency.

The present invention also provides a method and an apparatus for processing a digital signal in an optical disc system, which solve the problem of the number of data bits to be processed increasing in the event that an erasure flag is used.

In one aspect, the present invention is directed to a digital signal processing method for repeatedly correcting read digital data in an optical disc system, the method comprises: (a) demodulating digital data read from an optical disc to generate EFM demodulation data; (b) descrambling the EFM demodulation data and inspecting an error detection code (EDC) associated with the data to determine whether errors are present in the data; (c) when the EDC indicates that at least one error is present in the data, repeatedly performing a PI/PO error correction operation on the data, and transferring the resulting error-corrected data to a host; and (d) when the EDC indicates that no errors are present in the data, transferring the data to the host without performing PI/PO error correction operation on the data.

In one embodiment, the PI/PO error correction operation is repeatedly performed until no uncorrectable codewords remain in the data.

In another embodiment, (c) further comprises determining whether a number of times the error correction operation is repeatedly performed is equal to a predetermined maximum number of repetitions n, and if so, transferring the error-corrected data to a host.

In another embodiment, (c) further comprises descrambling the error-corrected data and generating an error flag when a code error exists, and performing the PI/PO error correction using the error flag.

In another embodiment, the method further comprises descrambling the error-corrected data resulting from step (c) or the data that is not error corrected resulting from step (d) in response to an external data request signal and changing a protocol in response to whether an error is present, as indicated by an error flag.

In another aspect, the present invention is directed to a digital signal processing apparatus for repeatedly correcting read digital data in an optical disc system, the apparatus comprising: an EFM demodulator that demodulates digital data read from an optical disc to generate EFM demodulation data; a first descrambling and EDC unit that descrambles the EFM demodulation data and inspects an error detection code (EDC) associated with the data to determine whether an error is present in the EFM demodulation data, an error correction code (ECC) unit that, in the event that an error is present in the EFM demodulation data, repeatedly performs an error correction operation on the data, and transfers the resulting error-corrected data to a host. In the event that no error is present in the EFM demodulation data, the data is transferred to the host without performing an error correction operation on the data.

In one embodiment, in the event that an error is present in the EFM demodulation data, the error correction operation is repeatedly performed until no uncorrectable codewords remain in the EFM demodulation data.

In another embodiment, the error correction operation comprises a PI/PO error correction operation.

In another embodiment, the ECC unit determines whether the number of times error correction is performed equals a predetermined number, and if so, transfers the resulting error correction data to a host.

In another embodiment, the digital signal processing apparatus further comprises a memory storing the EFM demodulation data and the error-corrected data.

In another embodiment, the digital signal processing apparatus further comprises a second descrambling and EDC unit descrambling the error-corrected data to generate an error flag for error correction and generating the error flag when there a code error exists.

In another embodiment, the digital signal processing apparatus further comprises a descrambler that descrambles the error-corrected data in response to an external data request signal and changing a protocol in response to the error flag.

In another aspect, the present invention is directed to a digital signal processing method for erasure correction of a PI code of read digital data in an optical disc system, the method comprising: (a) demodulating digital data read from an optical disc to generate EFM demodulation data; (b) generating an erasure location on a GF field at a corresponding position in each codeword for a data segment having an EFM demodulation error; (c) storing the erasure location in a memory; and (d) additionally reading the erasure location corresponding to the corresponding codeword when an ECC unit reads a PI codeword, to use the read erasure location for PI erasure correction.

In one embodiment, in step (c), a 10-byte erasure location is stored for each corresponding codeword.

In another embodiment, in step (c), the erasure location is stored in 8 bits in the memory.

In another aspect, the present invention is directed to a digital signal processing apparatus for erasure correction of a PI code of read digital data in an optical disc system, the apparatus comprising: an EFM demodulator that demodulates digital data read from an optical disc to generate EFM demodulation data, that generates an erasure location on a GF field at a corresponding position in each codeword for a data segment having an EFM demodulation error, and that stores the erasure location in a memory; and an ECC unit that carries out PI erasure correction on the EFM demodulation data using an error correction code and the erasure location corresponding to the PI codeword, and that outputs the error-corrected data to a host.

In one embodiment, the EFM demodulator stores a 10-byte erasure location in the memory for each corresponding codeword.

In another embodiment, the EFM demodulator stores the erasure location in 8 bits in the memory.

In another aspect, the present invention is directed to a digital signal processing method for repeatedly correcting read digital data in an optical disc system, the method comprising: (a) demodulating digital data read from an optical disc to generate EFM demodulation data; (b) generating an erasure location on a GF field at a corresponding position in each codeword for a byte having an EFM demodulation error; (c) storing the erasure location in a memory; (d) descrambling the EFM demodulation data and inspecting an error detection code (EDC) associated with the data to determine whether errors are present in the data; (e) when the EDC indicates that at least one error is present in the data, repeatedly performing a PI/PO error correction operation on the data, and transferring the resulting error-corrected data to a host; and (f) when the EDC indicates that no errors are present in the data, transferring the data to the host without performing PI/PO error correction operation on the data.

In one embodiment, the PI/PO error correction operation is repeatedly performed until no uncorrectable codewords remain in the data.

In another embodiment, step (e) further comprises determining whether a number of times the error correction operation is repeatedly performed is equal to a predetermined maximum number of repetitions n, and if so, transferring the error-corrected data to a host.

In another embodiment, in step (c), a 10-byte erasure location is stored for each corresponding codeword.

In another aspect, the present invention is directed to a digital signal processing apparatus for repeatedly correcting read digital data in an optical disc system, the apparatus comprising: (a) an EFM demodulator that demodulates digital data read from an optical disc to generate EFM demodulation data, that generates erasure location on a GF field at a corresponding position in each codeword for a data segment having an EFM demodulation error, and that stores the erasure location in a memory; a first descrambling and EDC unit that descrambles the EFM demodulation data and inspects an error detection code (EDC) associated with the data to determine whether an error is present in the EFM demodulation data, and that, in the event that no error is present in the EFM demodulation data, transferring a corresponding codeword block to a host without carrying out error correction on the codeword block, and that, in the event that an error is present in the EFM demodulation data, outputting the corresponding codeword block to an ECC unit; and the ECC unit that performs PI erasure correction on the EFM demodulation data using an error correction code and the erasure location corresponding to a PI codeword, and outputting the error-corrected data to the host, wherein the ECC unit repeats PI/PO correction multiple times until no uncorrectable codewords remain in the EFM demodulation data.

In one embodiment, the EFM demodulator stores 10-byte erasure location in the memory for each corresponding codeword.

In another embodiment, the ECC unit checks whether the number of times PI/PO correction is performed equals a predetermined number, and if so, stops PI/PO correction and outputs the error-corrected data.

BRIEF DESCRIPTION OF THE DRAWINGS

The above and other features and advantages of the present invention will become more apparent by describing in detail exemplary embodiments thereof with reference to the attached drawings, in which.

DETAILED DESCRIPTION OF THE INVENTION

Figure 1:
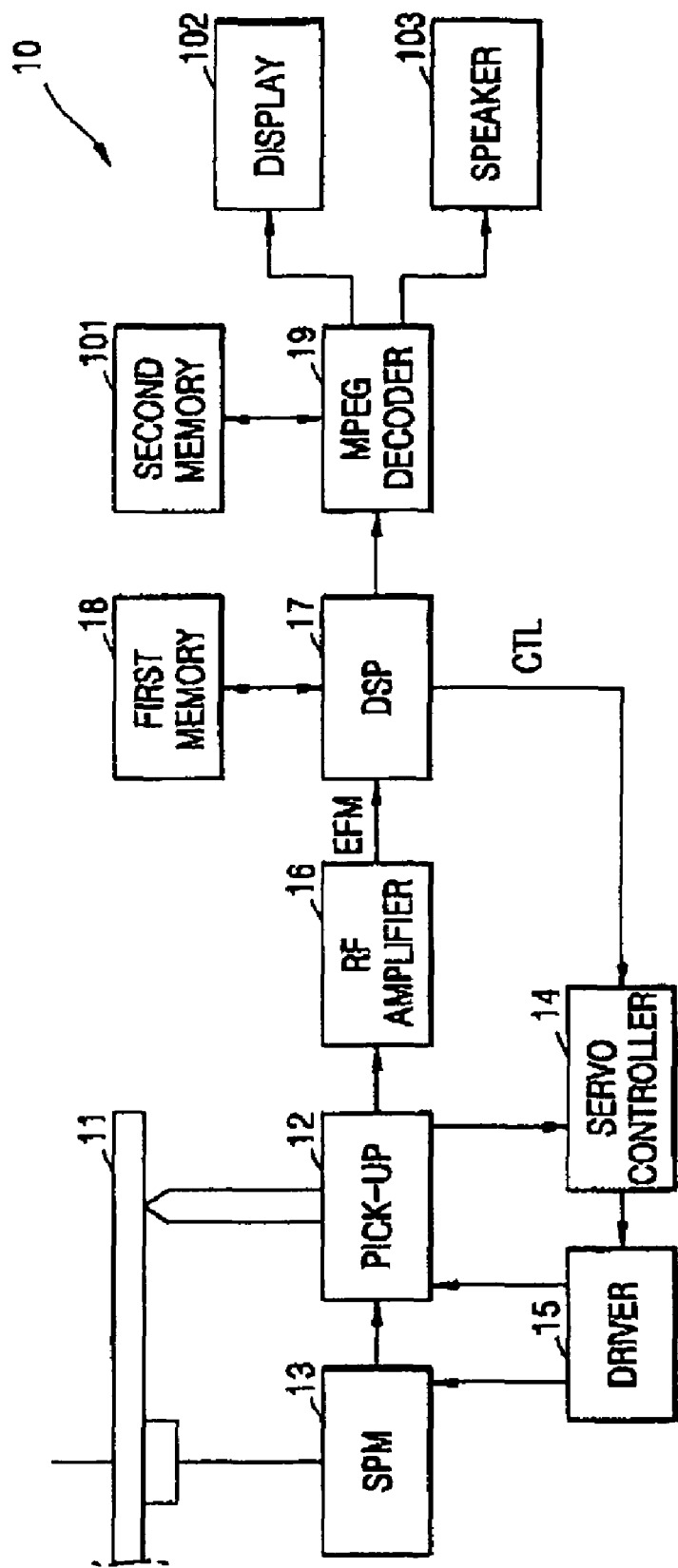
FIG. 1 is a block diagram of a conventional DVD system.

The present invention will now be described more fully with reference to the accompanying drawings, in which exemplary embodiments of the invention are shown. The invention may, however, be embodied in many different forms and should not be construed as being limited to the embodiments set forth herein. Throughout the drawings, like reference numerals denote like elements.

FIG. 1 is a block diagram of a general DVD system 10, which is a type of optical disc system. Referring to FIG. 1, the DVD system 10 includes a pick-up 12, a spindle motor 13, a servo controller 14, a driver 15, an RF amplifier 16, a digital signal processor 17, first and second memories 18 and 101, an MPEG decoder 19, a display 102, and a speaker 103.

The pick-up 12 radiates a laser beam onto a track of a disc 11 and detects a beam reflected from the track of the disc 11. The spindle motor 13 rotates the disc 11. The RF amplifier 16 converts the reflected beam into an electric signal to output various error signals, and slices the electric signal to output an EFM signal. The digital signal processor 17 carries out EFM demodulation, error correction, error detection, and descrambling of the EFM signal. Furthermore, the digital signal processor 17 detects a frame synchronous pattern from the EFM signal and outputs a spindle motor control signal CTL.

The servo controller 14 performs spindle control, focus control, and tracking control operations in response to the error signals and spindle motor control signal CTL. The servo controller 14 controls the driver 15, which controls the pick-up 12 and the spindle motor 13. The first memory 18 stores data generated when the digital signal processor 17 processes signals. The MPEG decoder 19 MPEG-decodes data descrambled by the digital signal processor 17, storing processed data in the second memory 101, and outputs the MPEG-decoded data to the display 102 and the speaker 103.

The present invention relates to the digital signal processor 17 of the optical disc system shown in FIG. 1. The present invention places an error detection code (EDC) block that receives signals from an input EFM demodulator to determine in advance whether an error in input data needs to be corrected, in order to reduce error correction cycles in the system, and thereby prevent reduction of the throughput of the digital signal processor of the optical disc system. According to the present invention, error correction is not carried out when an inspection of the EDC indicates that there are no errors in the data; rather, to prevent reduction of system throughput, error correction is performed only when there is an error in the data. For data that contains errors, repetitive correction is performed to a maximum of n repetitions according to the quantity of errors. The number of correction repetitions can be varied, and optionally increased, to maximize error correction capability.

Figure 2:
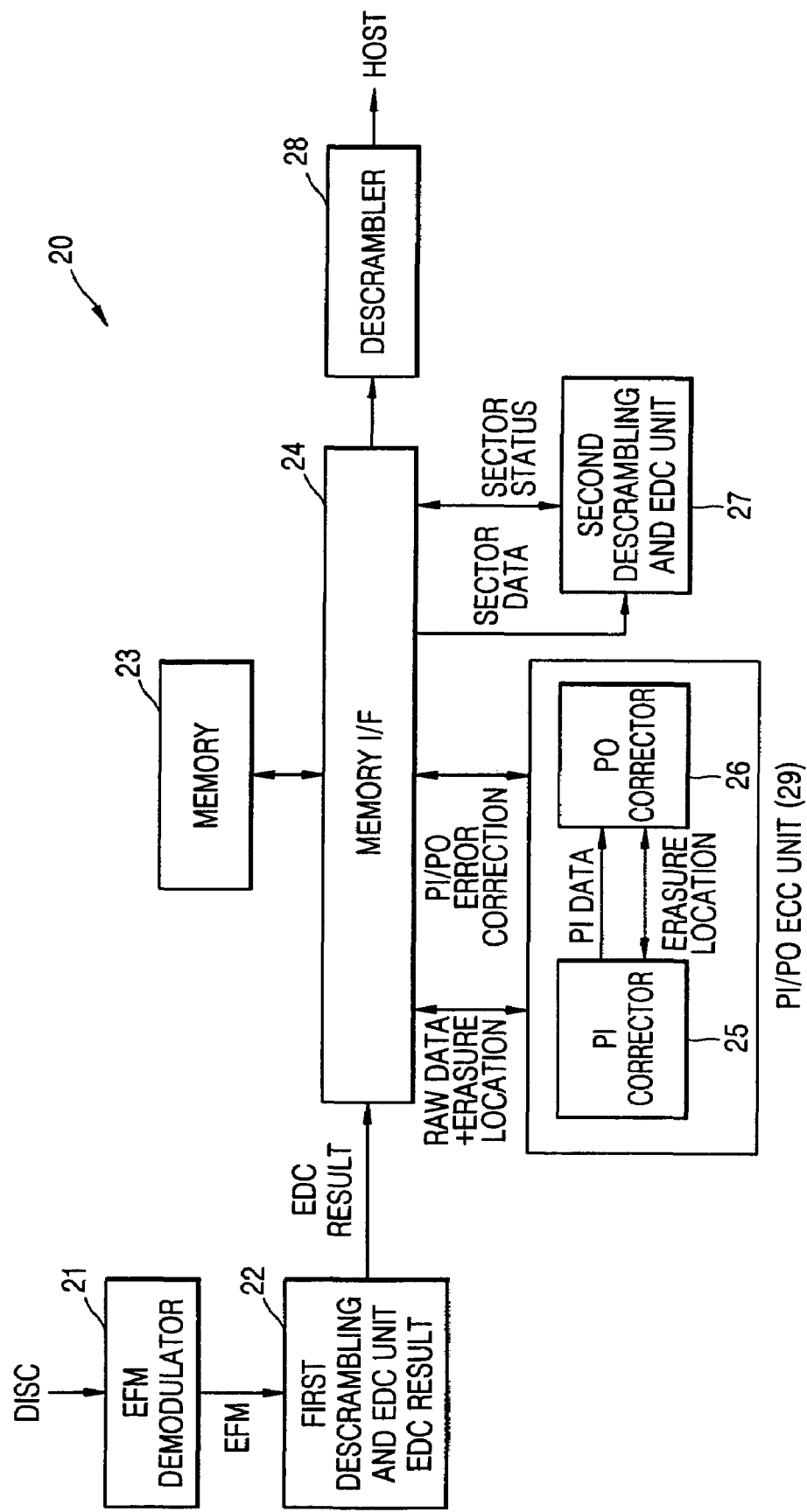
FIG. 2 is a block diagram of a digital signal processor of an optical disc system according to an embodiment of the present invention.

FIG. 2 is a block diagram of a digital signal processor 20 of an optical disc system according to an embodiment of the present invention. Referring to FIG. 2, the digital signal processor 20 includes an EFM demodulator 21, a first descrambling and EDC unit 22, a memory 23, a memory interface 24, an error correction code (ECC) unit 29 comprising a PI corrector 25 and a PO corrector 26, a second descrambling and EDC unit 27, and a descrambler 28.

The EFM demodulator 21 demodulates digital data read from an optical disc to generate EFM demodulation data. The first descrambling and EDC unit 22 descrambles the EFM demodulation data generated by the EFM demodulator 21 and checks an EDC to detect whether there are any errors in the data. The first descrambling and EDC unit 22 transmits a corresponding codeword block to a host without performing error correction when there are no errors in the data, and when there is at least one error in the data, and outputs the corresponding codeword block to the ECC unit 29 to correct the error(s), if any. A codeword refers to a unit block of received data, that is encoded using an error correcting code, and assigned a parity reference.

The ECC unit 29 corrects any error(s) in the EFM demodulation data based on an error correction code and outputs the error-corrected data to the host. The ECC unit 29 repeats PI/PO correction a maximum of n times, to remove the uncorrectable, or unrecoverable, code from the EFM demodulation data. That is, the ECC unit 29 repeats error correction when an error remains in the EFM demodulation data, even after the PI/PO correction has been carried out. The maximum number of repetitions of repetitive correction is fixed to n. When there is no uncorrectable codeword present in the EFM demodulation data after error correction, the ECC unit 29 stops repetitive correction and performs error correction on the next block. In one example, when n=7, the number of repetitions of error correction varies from block to block in response to the pattern of errors in input codeword blocks, but never exceeds 7.

Furthermore, the ECC unit 29 determines whether the number of PI/PO correction repetitions exceeds the maximum number n. When the number of repetitions exceeds n, the ECC unit 29 stops PI/PO correction and outputs the error-corrected data. Accordingly, endless repetition of error correction is prevented.

The PI corrector 25 corrects an error in a PI code, which is an inner code, and the PO corrector 26 corrects an error in a PO code, which is an outer code.

The memory 23 stores data generated during digital signal processing, such as the EFM demodulation data and error-corrected data. The memory interface 24 carries out an interfacing operation such that data is transmitted among the memory 23, the PI corrector 25, the PO corrector 26, the second descrambling and EDC unit 27, and the descrambler 28.

The second descrambling and EDC unit 27 descrambles the PI/PO corrected data. The presence of an error in the descrambled data is determined using the error detection code (EDC), and the result of the error check is recorded a register of the processor 20.

The first descrambling and EDC unit 22 of the digital signal processor 20 according to the present invention solves problems in data throughput and latency which can be generated when the number of times of correcting errors is varied. If all EFM demodulation data is subjected to error correction by the ECC unit 29 in repetitive correction mode, the input EFM demodulation data blocks cannot be subjected to the full number of error correction repetitions and need to be in a buffered state. This negatively affects system latency. The first descrambling and EDC unit 22 minimizes latency deterioration when error correction is repeated a maximum of n times. The first descrambling and EDC unit 22 accomplishes this by descrambling raw data output from the EFM demodulator 21 and inspects the raw data. When there are no errors, the first descrambling and EDC unit 22 ensures that error correction is not performed by the ECC unit on the corresponding codeword block. Accordingly, deterioration of system latency, which can be generated by a large number of error correction repetitions, can be mitigated.

The operation of the digital signal processor 20 shown in FIG. 2 will now be explained.

The EFM demodulator 21 demodulates data read from the optical disc, and the first descrambling and EDC unit 22 inspects an EDC associated with the data to determine whether there are any errors in the data. When there are no errors, the data is not error-corrected and it is transmitted to the host. When the EDC indicates that there is at least one error in the data, the data is transmitted to the ECC unit 29 and PI/PO correction is carried out once. Then, it is judged whether there are any uncorrectable codewords remaining in the corresponding codeword block. When there are no uncorrectable codewords remaining in the codeword block, error correction is halted and the data is output. When there are uncorrectable codewords remaining in the data, PI/PO correction is performed again and it is again determined whether there are still any uncorrectable codewords left in the data. In this manner, repetitive correction is performed a variable number of times, up to a maximum of n times, until no uncorrectable codewords remain. The second descrambling and EDC unit 27 descrambles the error-corrected data and then carries out PI/PO correction using the generated error flag.

The systems and methods of the present invention convert erasure information, generated when EFM demodulation (or EFM+demodulation) is carried out, into erasure location on $GF(2^8)$, and then adds 10-bytes erasure location to a back portion of the parity of each PI codeword to use the information for PI erasure correction, thereby effectively performing PI erasure correction. When a demodulation error occurs during demodulation of the EFM+data, a 1-bit error flag is marked with respect to the data (byte). The position of the error flag occurring for a single codeword is converted into a position on the Galois field $GF(2^8)$. Each of the error flag positions is converted into a 1-byte data element on $GF(2^8)$. For example, a PI codeword of a DVD is formed of data of 182 bytes and the position of the error flag can be converted to a particular value of 1 byte on $GF(2^8)$. Since the PI codeword is (182, 172, 1), erasure correction can be performed for up to 10 errors. Thus the erasure location of each codeword transferred to the ECC block is a maximum of 10 bytes. The transferred erasure location forms an erasure location polynomial during the ECC decoding. The erasure location polynomial is used as an initial value of the key equation solver with the syndrome polynomial generated from the codeword. Accordingly, the position and value of each codeword can be obtained.

Figure 3:
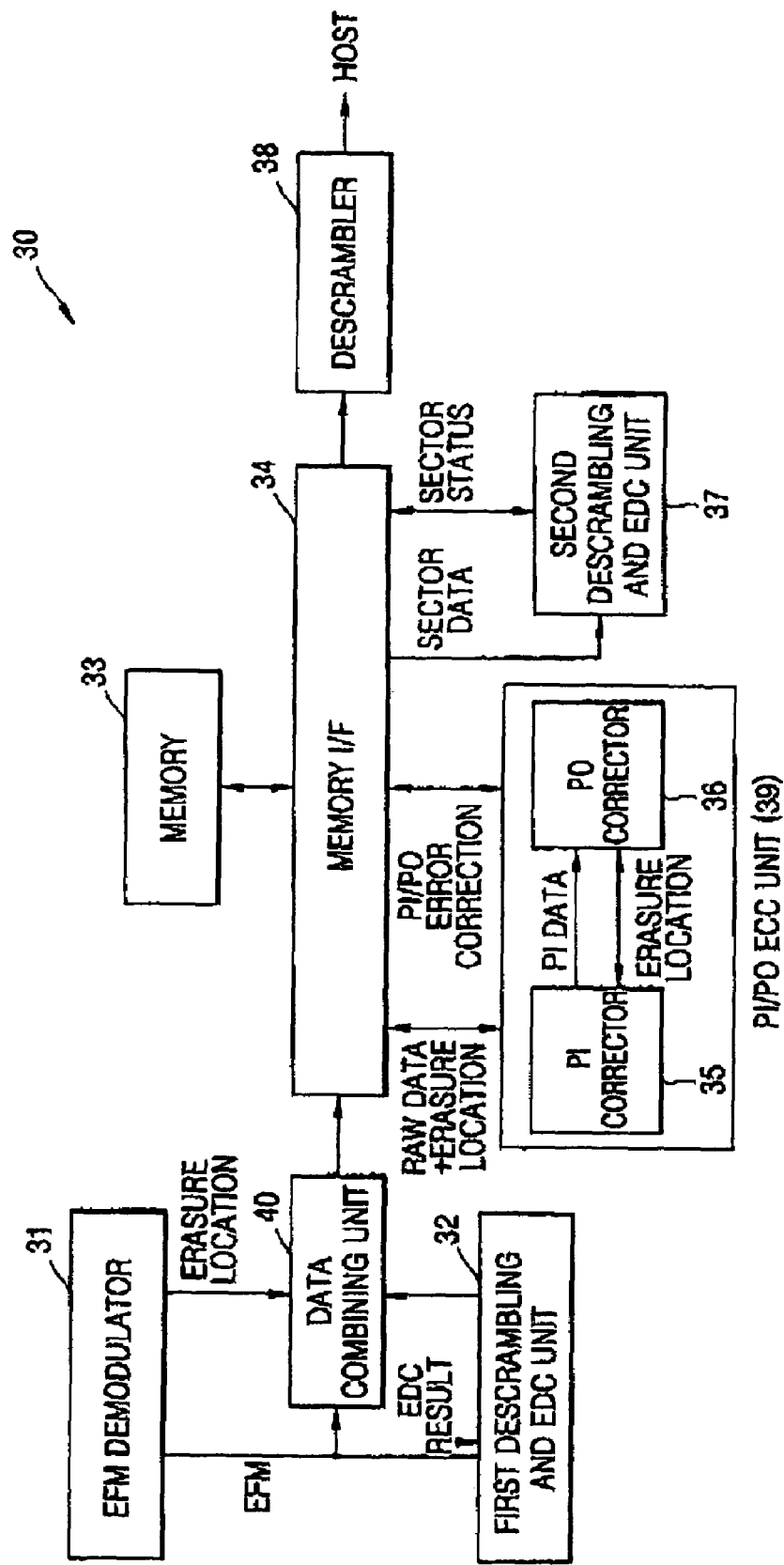
FIG. 3 is a block diagram of a digital signal processor of an optical disc system according to another embodiment of the present invention.

FIG. 3 is a block diagram of a digital signal processor 30 of an optical disc system according to another embodiment of the present invention. Referring to FIG. 3, the digital signal processor 30 includes an EFM demodulator 31, a first descrambling and EDC unit 32, a memory 33, a memory interface 34, an ECC unit 39 consisting of a PI corrector 35 and a PO corrector 36, a second descrambling and EDC unit 37, a descrambler 38, and a data combining unit 40. The data combining unit 40 can be included in the EFM demodulator 31.

To transfer erasure information for erasure correction of a PI code from the EFM demodulator 31 to the ECC unit 39, the digital signal processor 30 generates erasure location on $GF(2^8)$ at a corresponding position in each codeword for a byte having an EFM demodulation error that can be detected when the EFM demodulator 31 carries out EFM demodulation (or EFM+demodulation).

Specifically, the EFM demodulator 31 reads digital data from an optical disc to generate EFM demodulation data. Furthermore, the EFM demodulator 31 generates an erasure location on GF at a corresponding position in each codeword for a byte having an EFM demodulation error, and stores the erasure location in the memory 33. Here, the EFM demodulator 31 stores a 10-byte erasure location in the memory 33 for each corresponding codeword. The EFM demodulator 31 can store the erasure location corresponding to the codeword in 8 bits in the memory 33. Consequently, the present invention solves the conventional problem of the EFM demodulator having to add a 1-bit erasure flag to each byte and to store 9-bit erasure information in the memory.

The data combining unit 40 combines the corresponding codeword and erasure location. The data combining unit 40 can be included in the EFM demodulator 31.

The ECC unit 39 carries out PI erasure correction on the EFM demodulation data using an error correction code and the erasure location corresponding to the PI codeword, and outputs the error-corrected data to the host. The ECC unit 39 can repeat PI/PO correction a maximum of n times until no uncorrectable codewords remain in the EFM demodulation data, just like the ECC unit 29 of the digital signal processor 20 of FIG. 2. That is, the ECC unit 39 carries out repetitive correction when an error remains in the EFM demodulation data, even after PI/PO correction has been performed once. The maximum number of repetitions of repetitive correction can be set to n. When there are no uncorrectable codewords remaining in the EFM demodulation data, the ECC unit 39 stops repetitive correction on the present block and begins error correction on the next block. In one example, when n=7, the number of correction repetitions varies from block to block according to the pattern of errors in input codeword blocks, but does not exceed 7.

Furthermore, the ECC unit 39 determines whether the number of PI/PO correction repetitions exceeds the maximum number n. When the number of repetitions exceeds n, the ECC unit 39 stops PI/PO correction and outputs the error-corrected data. Accordingly, it is possible to prevent endless repetition of error correction.

The operation of the digital signal processor 30 shown in FIG. 3 will now be explained.

The EFM demodulator 31 demodulates data read from the optical disc and generates erasure location on GF at a corresponding position in each codeword for a byte having an EFM demodulation error. Then, the EFM demodulator 31 stores the generated erasure location in 10 bytes for each PI codeword.

The first descrambling and EDC unit 32 checks an EDC associated with the data to determine whether any errors are present in the data. When no errors are present, the first descrambling and EDC unit 32 transfers the EFM demodulation data to the host without performing error correction on the EFM demodulation data. When the EDC indicates that there is at least one error in the data, the first descrambling and EDC unit 32 transfers the EFM demodulation data to the ECC unit 39 where PI/PO correction is carried out once. Then, the ECC unit 39 determines whether any uncorrectable codewords remain in the corresponding codeword block. When there are uncorrectable codewords remaining in the codeword block, the ECC unit 39 carries out PI/PO correction once more and determines whether any uncorrectable codewords remain. In this manner, the ECC unit 39 repeats error correction until no uncorrectable codewords remain, or until the maximum number of repetitions n is reached.

When the ECC unit 39 performs PI/PO correction, the second descrambling and EDC unit 77 descrambles the PI/PO corrected data. The presence of an error in the descrambled data is determined using the error detection code (EDC), and the result of the error check is recorded a register of the processor 20. Particularly, in the event of PI correction, the erasure location corresponding to the PI codeword, stored in the memory 33, is read and used for PI erasure correction.

As described above, the present invention generates an erasure location when EFM demodulation is carried out, adds the erasure location to a corresponding codeword, stores it in memory, and uses it for PI correction. This solves the problem of the need for increasing the number of data bits to be processed when the optical disc system simultaneously employing the EFM demodulator and ECC unit uses the erasure flag. In addition, the approach taken by the present invention resolves the need for a large FIFO buffer, and solves a flag information timing problem.

According to the apparatus and method for processing a digital signal in an optical disc system of the present invention, a large number of error correction repetitions can be performed without the need for increasing the system operating frequency, and various patterns of errors can be corrected without reducing data throughput. Furthermore, the number of data bits to be processed does not increase when the optical disc system including the EFM demodulator and ECC unit utilizes the erasure flag.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A digital signal processing method for repeatedly correcting read digital data in an optical disc system, the method comprising:
   (a) demodulating digital data read from an optical disc to generate EFM demodulation data;
   (b) performing a first descrambling of the EFM demodulation data and inspecting an error detection code (EDC) associated with the data to determine whether errors are present in the data;
   (c) when the EDC indicates that at least one error is present in the data, repeatedly performing a PI/PO error correction operation on the data, and transferring the resulting error-corrected data to a host, wherein (c) further comprises performing a second descrambling of the error-corrected data and generating an error flag when a code error exists, and performing the PI/PO error correction operation using the error flag; and
   (d) when the EDC indicates that no errors are present in the data, transferring the data to the host without performing PI/PO error correction operation on the data.

2. The digital signal processing method of claim 1 wherein the PI/PO error correction operation is repeatedly performed until no uncorrectable codewords remain in the data.

3. The digital signal processing method of claim 1, wherein (c) further comprises determining whether a number of times the error correction operation is repeatedly performed is equal to a predetermined maximum number of repetitions n, and if so, transferring the error-corrected data to a host.

4. The digital signal processing method of claim 3, further comprising descrambling the error-corrected data resulting from step (c) or the data that is not error corrected resulting from step (d) in response to an external data request signal and changing a protocol in response whether an error is present.

5. A digital signal processing apparatus for repeatedly correcting read digital data in an optical disc system, the apparatus comprising:
   an EFM demodulator that demodulates digital data read from an optical disc to generate EFM demodulation data;
   a first descrambling and EDC unit that descrambles the EFM demodulation data and inspects an error detection code (EDC) associated with the data to determine whether an error is present in the EFM demodulation data,
   an error correction code (ECC) unit that, in the event that an error is present in the EFM demodulation data, repeatedly performs an error correction operation on the data, and transfers the resulting error-corrected data to a host; and
   a second descrambling and EDC unit that descrambles the error-corrected data and generates an error flag for error correction when a code error exists, wherein, in the event that no error is present in the EFM demodulation data, the data is transferred to the host without performing an error correction operation on the data.

6. The digital signal processor of claim 5 wherein, in the event that an error is present in the EFM demodulation data, the error correction operation is repeatedly performed until no uncorrectable codewords remain in the EFM demodulation data.

7. The digital signal processor of claim 5 wherein the error correction operation comprises a PI/PO error correction operation.

8. The digital signal processing apparatus of claim 5, wherein the ECC unit determines whether the number of times error correction is performed equals a predetermined number, and if so, transfers the resulting error correction data to a host.

9. The digital signal processing apparatus of claim 5, further comprising a memory that stores the EFM demodulation data and the error-corrected data.

10. The digital signal processing apparatus of claim 5, further comprising a descrambler that descrambles the error-corrected data in response to an external data request signal and changing a protocol in response to the error flag.

11. A digital signal processing method for erasure correction of a PI code of read digital data in an optical disc system, the method comprising:
    (a) demodulating digital data read from an optical disc to generate EFM demodulation data;
    (b) generating an erasure location on a GF field at a corresponding position in each codeword for a data segment having an EFM demodulation error;
    (c) storing the erasure location in a memory;
    (d) performing a first descrambling of the EFM demodulation data and inspecting an error detection code (EDC) associated with the data to determine whether errors are present in the data;
    (e) when the EDC indicates that at least one error is present in the data, repeatedly performing a PI/PO error correction operation on the data, and transferring the resulting error-corrected data to a host, wherein (e) further comprises performing a second descrambling of the error-corrected data and generating an error flag when a code error exists, and performing the PI/PO error correction operation using the error flag;
    (f) additionally reading the erasure location corresponding to the corresponding codeword when an ECC unit reads a PI codeword, to use the read erasure location for PI erasure correction.

12. The digital signal processing method of claim 11, wherein in (c), a 10-byte erasure location is stored for each corresponding codeword.

13. The digital signal processing method of claim 12, wherein in (c), the erasure location is stored in 8 bits in the memory.

14. A digital signal processing apparatus for erasure correction of a PI code of read digital data in an optical disc system, the apparatus comprising:
    an EFM demodulator that demodulates digital data read from an optical disc to generate EFM demodulation data, that generates an erasure location on a GF field at a corresponding position in each codeword for a data segment having an EFM demodulation error, and that stores the erasure location in a memory;
    a first descrambling and EDC unit that descrambles the EFM demodulation data and inspects an error detection code (EDC) associated with the data to determine whether an error is present in the EFM demodulation data;

an ECC unit that carries out PI erasure correction on the EFM demodulation data using an error correction code and the erasure location corresponding to the PI codeword, and that outputs the error-corrected data to a host; and a second descrambling and EDC unit that descrambles the error-corrected data and generates an error flag for error correction when a code error exists, wherein, in the event that no error is present in the EFM demodulation data, the data is transferred to the host without performing an error correction operation on the data.

15. The digital signal processing apparatus of claim 14, wherein the EFM demodulator stores a 10-byte erasure location in the memory for each corresponding codeword.

16. The digital signal processing apparatus of claim 15, wherein the EFM demodulator stores the erasure location in 8 bits in the memory.

17. A digital signal processing method for repeatedly correcting read digital data in an optical disc system, the method comprising:
(a) demodulating digital data read from an optical disc to generate EFM demodulation data;
(b) generating an erasure location on a GF field at a corresponding position in each codeword for a byte having an EFM demodulation error;
(c) storing the erasure location in a memory;
(d) performing a first descrambling of the EFM demodulation data and inspecting an error detection code (EDC) associated with the data to determine whether errors are present in the data;
(e) when the EDC indicates that at least one error is present in the data, repeatedly performing a PI/PO error correction operation on the data, and transferring the resulting error-corrected data to a host, wherein (e) further comprises performing a second descrambling of the error-corrected data and generating an error flag when a code error exists, and performing the PI/PO error correction operation using the error flag; and
(f) when the EDC indicates that no errors are present in the data, transferring the data to the host without performing PI/PO error correction operation on the data.

18. The digital signal processing method of claim 17 wherein the PI/PO error correction operation is repeatedly performed until no uncorrectable codewords remain in the data.

19. The digital signal processing method of claim 18, wherein (e) further comprises determining whether a number of times the error correction operation is repeatedly performed is equal to a predetermined maximum number of repetitions n, and if so, transferring the error-corrected data to a host.

20. The digital signal processing method of claim 18, wherein in (c), a 10-byte erasure location is stored for each corresponding codeword.

21. A digital signal processing apparatus for repeatedly correcting read digital data in an optical disc system, the apparatus comprising:
(a) an EFM demodulator that demodulates digital data read from an optical disc to generate EFM demodulation data, that generates erasure location on a GF field at a corresponding position in each codeword for a data segment having an EFM demodulation error, and that stores the erasure location in a memory;
a first descrambling and EDC unit that descrambles the EFM demodulation data and inspects an error detection code (EDC) associated with the data to determine whether an error is present in the EFM demodulation data, and that, in the event that no error is present in the EFM demodulation data, transferring a corresponding codeword block to a host without carrying out error correction on the codeword block, and that, in the event that an error is present in the EFM demodulation data, outputting the corresponding codeword block to an ECC unit;
the ECC unit that performs PI erasure correction on the EFM demodulation data using an error correction code and the erasure location corresponding to a PI codeword, and outputting the error-corrected data to the host, wherein the ECC unit repeats PI/PO correction multiple times until no uncorrectable codewords remain in the EFM demodulation data; and
a second descrambling and EDC unit that descrambles the error-corrected data and generates an error flag for error correction when a code error exists.

22. The digital signal processing apparatus of claim 21, wherein the EFM demodulator stores 10-byte erasure location in the memory for each corresponding codeword.

23. The digital signal processing apparatus of claim 21, wherein the ECC unit checks whether the number of times PI/PO correction is performed equals a predetermined number, and if so, stops PI/PO correction and outputs the error-corrected data.

* * * * *